United States Patent [19]

Ledeen et al.

[11] 3,742,148

[45] June 26, 1973

[54] MULTIPLEXING SYSTEM

[76] Inventors: Kenneth S. Ledeen, 71 Elm Street, Holliston, Mass. 01746; William M. Kahn, 189 Summit Avenue, Brookline, Mass. 02146

[22] Filed: Mar. 1, 1972

[21] Appl. No.: 230,912

[52] U.S. Cl....... 179/15 BA, 179/15 AL, 340/172.5

[51] Int. Cl............. H04j 3/16

[58] Field of Search............ 340/172.5; 179/15 BA, 15 AL

[56] References Cited

UNITED STATES PATENTS

| | | | |
|---|---|---|---|
| 3,456,242 | 7/1969 | Lubkin | 340/172.5 |
| 3,517,130 | 6/1970 | Rynders | 179/15 AL |
| 3,603,739 | 9/1971 | Edson | 179/15 AL |
| 3,643,030 | 2/1972 | Sparrendahl | 179/15 BA |

*Primary Examiner*—Ralph D. Blakeslee
*Attorney*—C. Yardley Chittick, Charles E. Pfund et al.

[57] ABSTRACT

A system for operatively connecting, one at a time, a plurality of sequentially arranged identical data input stations to a single terminal for data transmission. Each station contains a control circuit which is associated with it and each control circuit is connected to those control circuits associated with the next preceding and next succeeding stations. A signal is applied to each control circuit when data is to be transmitted from its associated station to thereby condition that station for transmission. Each control circuit operates to disable from transmitting its station's next succeeding station when either its own station is conditioned for transmission or when it itself is disabled by the control circuit of the next preceding station. Each control circuit also operates to disable from transmitting the next preceding station when it itself is disabled by the control circuit of the next succeeding station or when its own station is conditioned for transmission and it is not disabled by the next preceding control circuit. In the unusual situation where two stations are conditioned for transmission at exactly the same time, the succeeding station is given priority and its control circuit is able to disable the preceding station.

14 Claims, 2 Drawing Figures

MULTIPLEXING SYSTEM

BACKGROUND OF THE INVENTION

This invention relates generally to a system for operatively connecting, one at a time, a plurality of stations with a single terminal. More particularly, this invention relates to the system for so connecting a plurality of data stations to a single terminal for data transmission.

There are numerous known systems which allow a plurality of data stations to be connected for transmission to a single terminal via a single communications line. Since only one line is used the flow of data must obviously be controlled from the stations to the terminal so that only one station is communicating at a time. This function of so controlling the flow of data is termed "multiplexing."

In previous systems, a separate multiplexer unit is generally used. The multiplexer is connected between the stations and the terminal to thereby regulate the flow of data. Since such multiplexers have set predetermined capabilities, one must be chosen which is able to regulate data flow from the number of stations which are intended for the system. However, if the number of stations in the system is increased, the multiplexer may not be able to handle the added stations. If the number of stations is decreased, the multiplexer will not be used to its full capability.

SUMMARY OF THE INVENTION

It is the primary object of this invention to provide an improved system for operatively connecting, one at a time, a plurality of stations with a single terminal which is reliable, low in cost and easy to maintain.

It is another object to provide such a system wherein each station is provided with a portion of the multiplexing apparatus of the system so that separate stations may be added to or deleted from the system without requiring a change in the multiplexer apparatus.

It is a further object to provide such a system where each station contains identical portions of the system's multiplexing apparatus so that the stations may be rearranged without affecting the system's multiplexing capabilities.

According to the invention, a method and apparatus are provided whereby a plurality of sequentially arranged stations are operatively connected to a single terminal. Thus, the invention may be used to feed data from a plurality of data stations to a single receiver.

Each station has a control circuit which is interconnected to corresponding control circuits in the next preceding and next succeeding stations. Each control circuit receives a control signal when its associated station is to be connected to the terminal, thus conditioning the station for transmission. The control circuit of each station operates to send a disable signal to the next succeeding station when its own station is conditioned for transmission or is itself disabled by a signal from the next preceding station. Each control circuit also sends a disable signal to its next preceding circuit when it itself is disabled by a signal from the next succeeding circuit or when its station is conditioned for transmission and not disabled by the next preceding station.

In those unusual situations where two stations are conditioned for transmission at exactly the same time, the succeeding station is given priority and its control circuit operates to disable the preceding station.

Each control circuit also provides an ON signal when its station is connected to the terminal. For those situations where a preceding and a succeeding circuit are conditioned at the same time and the succeeding circuit disables the preceding circuit, an ON signal is not allowed to be generated from the preceding circuit. This is accomplished by an R-C filter provided at the input of that circuit element which generates that ON signal.

DESCRIPTION OF THE PREFERRED EMBODIMENT

Figure 1:
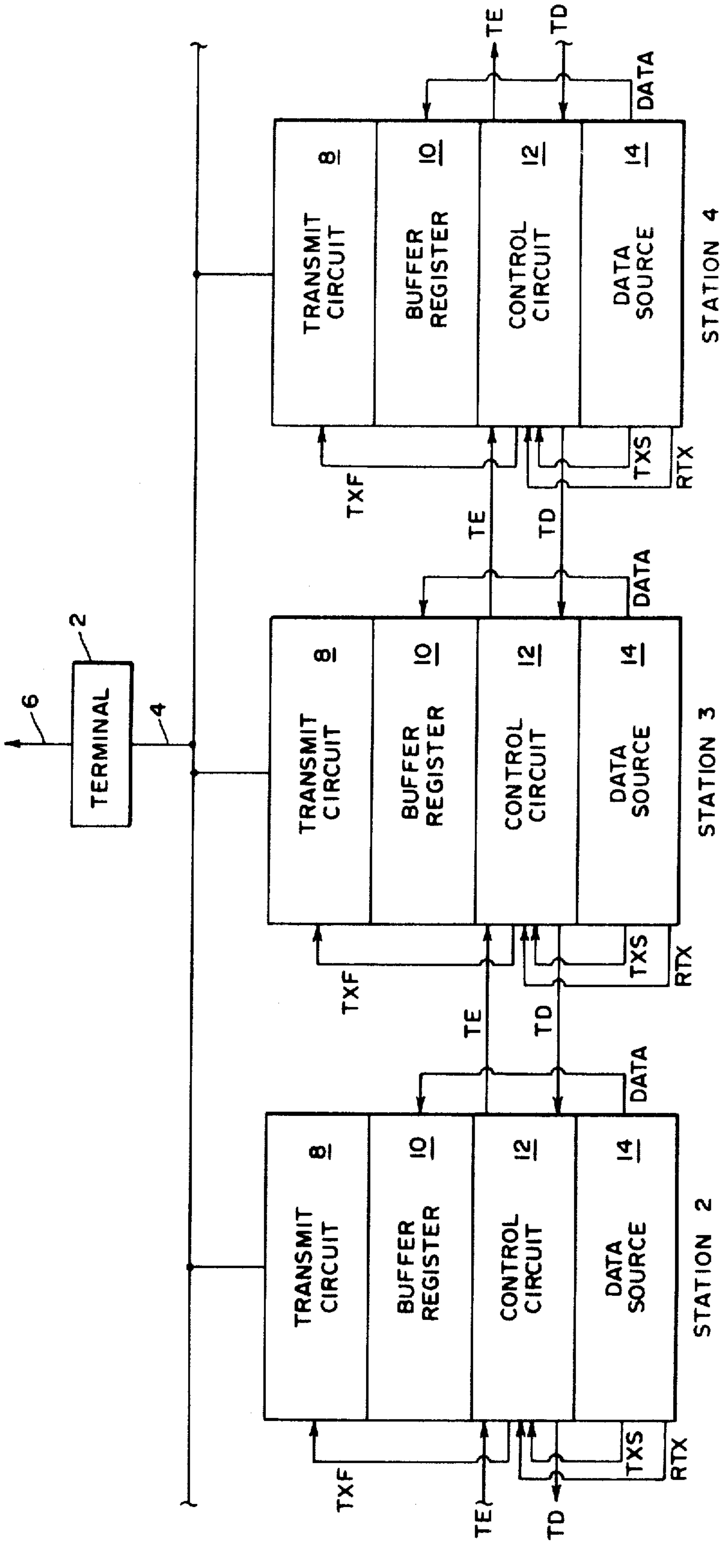
FIG. 1 is a block diagram of a preferred embodiment of the invention and where a plurality of data input stations transmit their data to a single terminal.

FIG. 1 illustrates a data input system where an illustrative plurality of data stations are adapted to be connected for transmitting data to a single terminal 2 via a common cable 4. The terminal 2 in turn is adapted to send the data over an output communications channel 6, as for example, a telephone line. The stations are sequentially arranged with station 2, station 3 and station 4 shown. However, the terminal 2 is also connected to receive data from other input stations which are not shown. Preferably, each block of data from one of the stations which is transmitted from terminal 2 over line 6 is internally coded so that the particular input station from where the data originated may be known at the data's ultimate destination.

As shown in FIG. 1, each station is identical and divided into four sections. A data source section 14 is shown to indicate the source of data which is to be transmitted from that particular station. As shown, the data from source 14 is loaded into another section of the station identified as a buffer register 10. Each buffer 10 is adapted to store the data from source 14 until it is able to be transmitted over cable 4 and line 6. Each station is also provided with a transmit circuit section 8 for sending the data from buffer 10 to terminal 2. The fourth section of each station is a control circuit section 12 which, according to the invention, interacts with similar control circuits in adjacent stations to perform a multiplexing function within the system.

Before further proceeding with a detailed description of the preferred embodiment, it is to be understood that the embodiment being described operates in a conventional logic manner; that is, the system operates on a binary voltage level basis wherein the inputs and outputs of the elements disclosed exist at either of two discrete voltage levels, the high or the low voltage level of the system. Further, each particular element performs a predetermined function in response to its high or low inputs.

Referring again to FIG. 1, in each station the data source 14 provides a TXS signal to that station's control circuit 12 as well as providing the data for buffer 10. The TXS signal when at the high level of the system indicates that a block of data has been loaded into the buffer 10 and awaits transmission to the terminal 2. The TXS signal remains at the high level until the block of data has been transmitted so that this signal conditions the station to transmit data. After the block of data has been transmitted, an RTX signal at the high voltage level of the system is applied to the control circuit from the data source.

As also shown in FIG. 1, the control circuit 12 of each station provides a TXF signal to the transmit section 8 of its station. This TXF signal is an enabling one and when at the high level causes the transmit section 8 to feed the data from buffer 10 to terminal 2.

As also shown in FIG. 1, the control circuits 12 of the sequentially arranged stations are interconnected. Each control circuit provides a TD signal to the control circuit in its station's next preceding station. That is, the control 12 of station 4 applies a TD signal to the control circuit of station 3 and this in turn is adapted to supply a TD signal to the control circuit of station 2. Further, each control circuit is adapted to feed a TE signal to the control circuit associated with the station next succeeding its own station. Thus, the control circuit 12 of station 2 is adapted to provide a TE signal to the control circuit of station 3 and this in turn is adapted to provide a TE signal to the control circuit of station 4. Actually, a low TD signal fed from a control circuit to the control circuit in the next preceding station operates to disable the receiving station from feeding data to terminal 2. Similarly, a TE signal, when low, fed from a control circuit to the control circuit in the next succeeding station operates to disable that succeeding station from transmitting data to the terminal 2.

Figure 2:
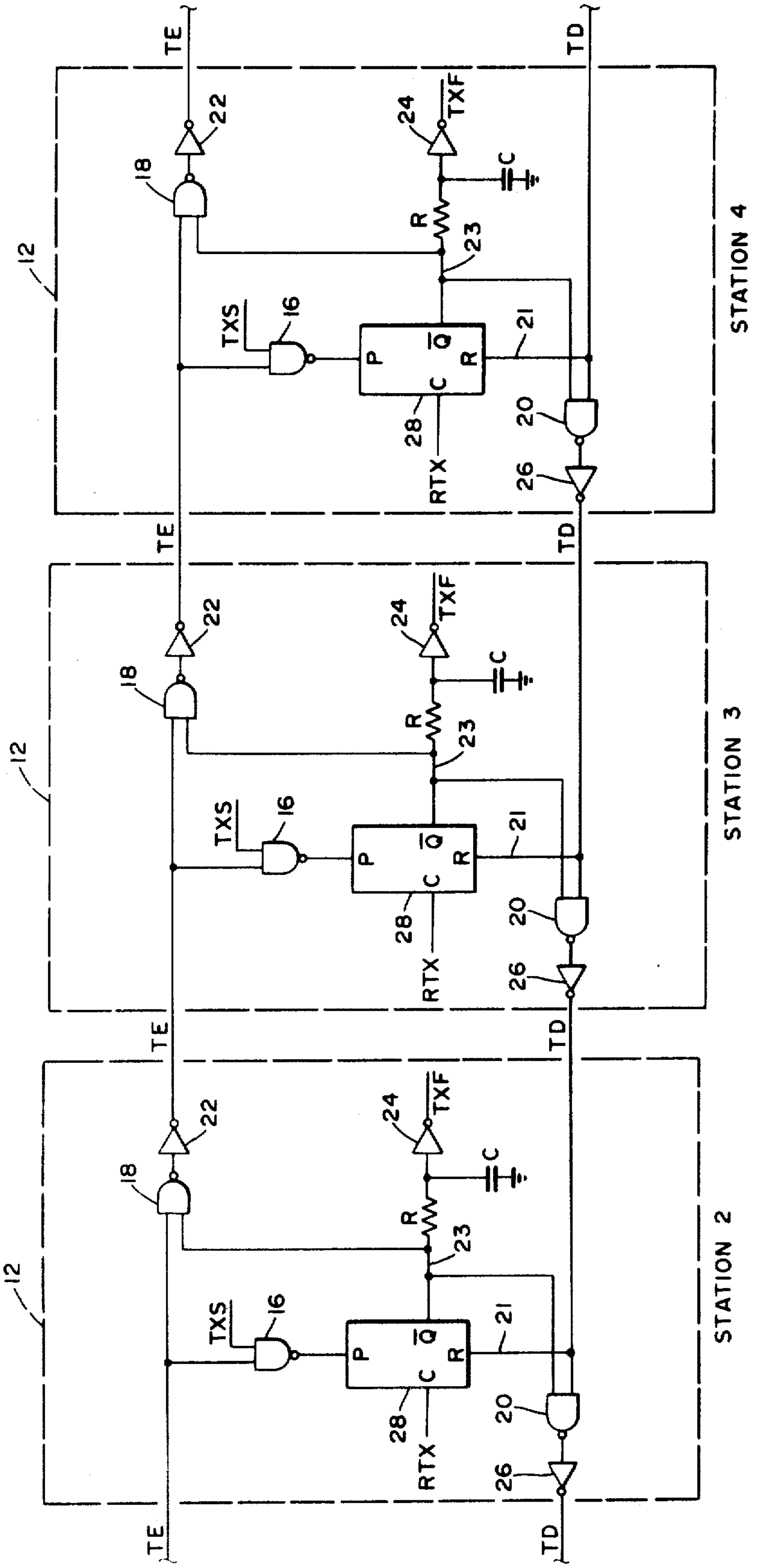
FIG. 2 is a circuit diagram of the control circuits shown in FIG. 1.

FIG. 2 illustrates the three interconnected control circuits shown as blocks in FIG. 1. As shown, each control circuit is identical and comprises three NAND gates designated 16,18 and 20. Each of these NAND gates has two inputs and operates to provide a low output voltage only when both of these input lines exist at the high level.

Each of the control circuits illustrated in FIG. 2 also includes three inverters designated 22,24, and 26. Each inverter provides an output level which is always opposite to its input level.

Further, each control circuit 12 contains a bistable circuit 28 having P, R, and C inputs and a $\bar{Q}$ output. This element operates so that a low signal applied to its P input causes a low signal at its $\bar{Q}$ output. However, a low signal applied to its R input or a high signal at its C input causes a high output at its $\bar{Q}$ output. Further, the R input is overriding so that if a low signal is applied to the P input simultaneously with a low signal at the R input, the output from $\bar{Q}$ will be high.

Referring to FIGS. 1 and 2 together, it may be seen that the TXF signal from the control circuit which is applied to the transmit section 8 of the station derives from the output of inverter 24. The RTX signal from the source section 14 is applied to the C input of circuit 28. Further, the TXS signal from the source section 14 of the station is applied to the control circuit 12 at one of the two inputs of a NAND gate 16. Also, the TE signal sent to a next successive control circuit is fed from the output of an inverter 22 to respective inputs of NAND gates 16 and 18 in the next successive station.

Additionally, the TD signal sent to the next preceding control circuit occurs at the output of the inverter 26 and is received at an input of a NAND gate 20 and applied to the R input of the bistable circuit 28 in the preceding station.

Referring again to FIG. 2, in each control circuit the output of its NAND gate 16 which receives the TXS signal and the TE signal from the next preceding control circuit is applied to the P input of bistable circuit 28. The $\bar{Q}$ output of bistable circuit 28 is fed to a NAND gate 18 which also receives the TE signal. The output of NAND gate 18 is applied to the input of inverter 22. The $\bar{Q}$ output of bistable circuit 28 is further applied to inverter 24 via an RC integrating network and also directly to one output of a NAND gate 20 which also receives the TD signal from the next successive control circuit. The output of NAND 20 is applied to inverter 26 to provide the TD signal that is fed to the next preceding control circuit.

As above noted, when discussing FIG. 1, the control circuits 12 of the data stations provide the system with its multiplexing capability. This is done via the TE and TD signals that are passed between adjacent control circuits.

The operation of the system will now be discussed. Consider the first situation where a preceding station, e.g., station 2, is transmitting data. Since it is transmitting the TD signal fed from station 3 and the TE signal fed from its next preceding station which is not shown both must be high. The TXS signal is also high since, as above noted, this remains at the high level until the station has transmitted its entire stored block of data. The RTX signal is at the low level until such a time. Thus, high signals are applied to the NAND gate 16 in the control circuit of station 2. In response, NAND gate 16 provides a low output which is applied to the P input of circuit 28 to produce a low signal at is $\bar{Q}$ output. This low is applied to the NAND gate 18 in the control circuit of station 2. Although NAND gate 18 is receiving the high TE signal it will become disabled upon receiving the low from the $\bar{Q}$ output of circuit 28 so that a high signal is applied to inverter 22. In response, inverter 22 provides a low output so that the TE signal fed to station 3 which is the station 2's next succeeding station is low.

This low TE signal applied to station 3 is perpetuated along all the succeeding stations. In station 3, the NAND gate 18 will not have a low input so that a high signal is applied to inverter 22 in station 3 and a low TE signal is fed between stations 3 and 4. The NAND gate 18 and inverter 22 in FIG. 4 act in a similar manner to again provide a low TE signal.

Referring back to the transmitting station 2, the low signal from the $\bar{Q}$ output of element 28 is fed to inverter 24 to provide a high TXF signal which enables station 2 to transmit. This condition exists until transmission has been accomplished and TXS becomes low and RTX becomes high to cause the $\bar{Q}$ output of element 28 to be at the high level. However, with reference to station 3, and the succedding stations, the low TE signal will force NAND gate 16 to provide a high output to input P of bistable circuit 28. Thus, the appropriate $\bar{Q}$ output will be high. When this high $\bar{Q}$ output is inverted by inverter 24 in station 3 th TXF signal in station 3 will be low thereby preventing transmission. Of course, the TXF signals from the control circuits in station 4 and the succeeding stations will be the same and be derived as just described in relation to station 3. Thus, it may be seen that a preceding station when transmitting generates a low TE signal which is promulgated down the line of successive stations to disable these successive stations from transmitting.

Consider now the case where one of the succeeding stations like station 4 is transmitting. Since it is transmitting, the TE signal and the TD signal received by it must be high. The TXS signal applied to NAND gate 16 in the control circuit of station 4 will, along with the high TE signal, cause NAND 16 to apply a low at the P input of bistable circuit 28. This will cause a low signal at the $\bar{Q}$ output of circuit 28 and a high TXF output from inverter 24 at station 4. As above noted, the high TXF signal in the control circuit of station 4 is applied to enable its transmit circuit section. The TXF signal stays high until transmission has been completed when the TXS and RTX signals become respectively low and high.

The low output from $\bar{Q}$ will decondition NAND 18 in the control circuit of station 4 so that inverter 22 will provide a negative signal to disable any stations not shown which are succeeding after station 4.

The low output from element 28 is also applied to the NAND gate 20 at station 4. In response, this NAND 20 will provide a high signal to inverter 26 so that a low TD signal is fed from station 4 to station 3. This low TD signal is promulgated from station 4 down the preceding stations since the NAND 20 at station 3, in response to receiving a low input, will provide a high output and its associated inverter 26 will provide a low TD signal to station 2. Of course, in response to the low TD signal from station 3, station 2 will correspondingly provide a low TD signal. With each of these preceding stations, each of their bistable circuits 28 must provide a high output at $\bar{Q}$ since a low signal is being applied to its R input via lead 21. Thus, the inverter 24 provides a low TXF signal prohibiting that station from transmitting. Thus, transmission at a succeeding station causes its associated control circuit to provide a low disabling TD signal to the next preceding control circuit and this low TD signal is promulgated along the line of preceding stations precluding them from transmitting.

With respect to the system's steady condition when none of the stations are transmitting to the terminal 2 in FIG. 1, the TXS signals applied to the control circuits are low and the RTX signals are high. Since it is assumed that none of the stations are transmitting, the TE and TD signals being sent between adjacent control circuits are all at the high level. Considering a typical control circuit like that associated with station 3 in FIG. 2, the NAND 16 will provide a high signal to input P of circuit 28 since the TXS signal is low. The high RTX signal applied to the C input of 28 causes a high at its output $\bar{Q}$ which is applied to NAND 18. Thus, NAND 18 has two high inputs enabling it to provide a low output which is inverted by inverter 22 to provide a high TE signal to the next succeeding control circuit in station 4.

Further, the high output from $\bar{Q}$ is inverted by inverter 24 in the control circuit of station 3 to produce a low TXF signal indicating that transmission is not desired.

Additionally, the high $\bar{Q}$ output of element 28 in station 3 is applied to its NAND 20. As above noted, the TD signal applied to station 3 will be high so that NAND 20 is enabled to produce a low output which is inverted by inverter 26 to cause a high TD signal to be applied from station 3 to station 2. In this manner, when none of the circuits are currently transmitting, high TE and TD signals are maintained between the station's respective control circuits to maintain the stations so that they each are able to transmit upon the application of a TXS signal.

One further situation needs to be considered. In unusual situations it is possible that a high TXS signal may be applied to one station simultaneously with a corresponding high TXS signal to another station. Of course, the RTX signals at both these stations are low. For example, assume that TXS signals are simultaneously applied to NANDS 16 in stations 2 and 3 when no other station is transmitting so that high TE and TD signals are occurring throughout the system. As above described, in station 2, NAND 16 will be enabled so that the $\bar{Q}$ output of circuit 28 provides a low signal. Further, a low TE signal is generated from station 2 to be applied to station 3. Ordinarily, such a low TE signal would disable station 3. However, at station 3, bistable circuit 28 is now also providing its own low output at $\bar{Q}$ to be inverted into a high TXF signal by inverter 25. Also, at station 3 the low output of element 28 is being applied to NAND 20. In response, NAND 20 generates a high signal which is inverted by inverter 26 at station 3 to become a low TD signal that is applied by lead 21 to the R input of circuit 28 in station 2.

As above noted, a low applied to the R input of any of the circuits 28 causes a high signal at the respective $\bar{Q}$ output. Thus, since element 28 at station 2 is receiving a low signal at its P input, the circuit is being subject to two conflicting inputs. This situation is resolved since R is an overriding input and signal instructions here override signals applied to input P. Thus, at station 2, the bistable circuit 28 will provide a high output. This high output when inverted by element 24 causes the TXF signal in station 2 to be low. In this manner, a succeeding station is given priority over a preceding station when TXS signals are simultaneously applied to both these stations.

It should be noted, however, that for the very short period existing between the time when station 2 received its TXS signal to when a low TD signal was applied from station 3 to the R input of circuit 28, in station 2, the $\bar{Q}$ output in station 2 is low. If this low signal was allowed to trigger inverter 24 into providing a high TXF signal, station 2 would begin transmitting. Since station 3 is now transmitting, this obviously would be an intolerable situation. An RC filter circuit is provided in each control circuit to solve this problem.

As shown in FIG. 2, each control circuit has a resistor R and a capacitor C connected on the lead 23 from the $\bar{Q}$ output of circuit 28 to the inverter 24. The resistor R is connected in series and the capacitor is connected between lead 23 and ground. Thus, the resistor and capacitor comprise an RC integrating network which filters out any very short pulses like those which would occur on lead 23 in the above situation. The resistor-capacitor filter prohibits the inverter 24 in station 2 from providing a high TXF signal before the low TD signal is applied to circuit 28. The resistance and capacitance values within the R-C circuit are obviously chosen to set the maximum duration of the pulses which are not allowed to trigger the inverter.

Thus, as explained with the preferred embodiment disclosed, each control circuit operates when transmitting to send a disabling signal to the next preceding circuit and this signal is promulgated down the line of the preceding stations. Further, each control circuit operates to feed a disabling signal to the next successive control circuit and this disabling signal is promulgated down the line of succeeding circuits. The terms "preceding" and "succeeding" have been used throughout this application. These terms are intended to only refer to the locations of the respective control circuits and stations within the arrangement in which they are sequentially connected. Obviously, no physical geographical arrangement is intended and the invention is not so limited.

With the invention, a portion of the multiplexing apparatus of the system is provided in each of the stations. Since, in the preferred embodiment, such portions (control circuit 12) are identical, the stations may be rearranged by merely changing the connections for sending the TD and TE signals between the respective stations.

It will be appreciated further that various changes in the form and details of the above-described preferred embodiment may be effected by persons of ordinary skill without departing from the true spirit and scope of the invention.

We claim:

1. A system for operatively connecting, one at a time, a plurality of stations with a single terminal, said system comprising a plurality of sequentially arranged control circuits, each of which is associated with a different one of said stations, and means for applying control signals to the control circuits associated with those stations to be connected to said terminal, each of said control circuits comprising means for feeding a first disable signal to its next succeeding control circuit in response to either receiving a first disable signal from its next preceding control circuit or a control signal, each said control circuit disabling its associated station from connecting to said terminal in response to receiving a first disable signal.

2. The system as recited in claim 1 wherein each control circuit further comprises means for feeding a second disable signal to its next preceding control circuit in response to receiving a second disable signal from its next succeeding control circuit, and wherein each said control circuit also disables its associated station from connecting to said terminal in response to receiving a second disable signal.

3. The system as recited in claim 2 wherein the second disable signal feeding means of each control circuit also operates in response to said control circuit receiving a control signal without also receiving a first disable signal from its next preceding control circuit.

4. The system as recited in claim 3 wherein each control circuit includes means for rendering inoperative said first disable signal feeding means in response to said control circuit receiving a second disable signal.

5. The system as recited in claim 4 wherein all of said control circuits are identical.

6. The system as recited in claim 1 wherein each control circuit further includes means for providing an ON signal in response to said control circuit receiving a control signal when a first disable signal is not received from its next preceding control circuit.

7. The system as recited in claim 6 wherein each control circuit further comprises means for feeding a second disable signal to its next preceding control circuit in response to either receiving a second disable signal from its next succeeding control circuit or a control signal without also receiving a first disable signal from its next preceding control circuit and means for disabling said ON signal providing means and said first disable signal feeding means in response to receiving a second disable signal from its next succeeding control circuit and wherein each said control circuit also disables its associated station from connecting to said terminal in response to receiving a second disable signal.

8. The system as recited in claim 7 wherein said ON signal providing means includes means for inhibiting the providing of an ON signal when said ON signal providing means is disabled within a predetermined short period of time after a control signal is received at its control circuit without a first disable signal being received.

9. The system as recited in claim 6 wherein each of said stations is adapted to transmit data to said terminal when connected to said terminal and further includes a register adapted to store the data to be transmitted.

10. The system as recited in claim 9 wherein said stored data is transmitted by said station in response to an ON signal from said station's associated control circuit.

11. A method for operatively connecting a plurality of sequentially arranged stations to a single terminal so that said stations may, one at a time, transmit data to said terminal where those stations ready to transmit data are conditioned, said method comprising: connecting each station with its next succeeding and its next preceding station so that it is able to individually disable both of said stations from transmitting data to said terminal; and operating each said station to disable its next succeeding station in response to being disabled by its next preceding station or in response to being conditioned.

12. The method as recited in claim 11 wherein each said station is further operated to disable its next preceding station in response to being disabled by its next succeeding station.

13. The method as recited in claim 12 wherein each said station is further operated to disable its next preceding station in response to being conditioned and not disabled by its next preceding station.

14. The method as recited in claim 13 wherein each station is further operated to discontinue disabling its next succeeding station in response to being disabled by said next succeeding station.

* * * * *